Oct. 4, 1932.  E. H. WALDMAN  1,880,545

ELECTRODE AND METHOD FOR WELDING CAST IRON

Filed Sept. 2, 1930

Inventor
Erwin H. Waldman
By Murray and Gugelter
Attorneys

Patented Oct. 4, 1932

1,880,545

UNITED STATES PATENT OFFICE

ERWIN H. WALDMAN, OF FORT MITCHELL, KENTUCKY

ELECTRODE AND METHOD FOR WELDING CAST IRON

Application filed September 2, 1930. Serial No. 479,204.

This invention relates to an electric arc welding electrode and method for the welding of cast iron to produce a readily machinable cast iron weld having the same or substantially the same characteristics and crystalline and chemical structure as the cast iron object being welded.

An object of the invention is to provide an electrode of the above character having incorporated therein the proper constituents, and proportions thereof, to produce a cast iron weld, when used in the welding of cast iron or other material having substantially the same carbon content.

Another object is to provide an electrode of the above character, which comprises a material that produces a slow cooling weld which results in the formation of a good grade of machinable gray cast iron.

Another object is to provide an electrode containing a proper amount of silicon to precipitate a maximum of the carbon constituent thereof which expands upon cooling, thereby tending to reduce shrinkage of the casting being welded.

Another object is to provide a welding electrode having an extending core of material, such as carbon or graphite, the purpose of which is to preheat the surfaces to be fused before the metal of the electrode begins to flow.

Another object is to produce a method of, and electrode for, the production of a strong and perfect cast iron weld that is machinable all the way through, to and including the fusion line.

Another object of the invention is to provide an electrode of the above character containing a material for reducing or oxidizing the usual sulphur and phosphorus content in the weld of the object to be welded, so as to retain the function of the silicon content of the electrode to precipitate graphitic carbon, which should remain to produce the weld of cast iron.

These and other objects are attained by the means described herein and disclosed in the accompanying drawing, in which.

Figures 1, 2:
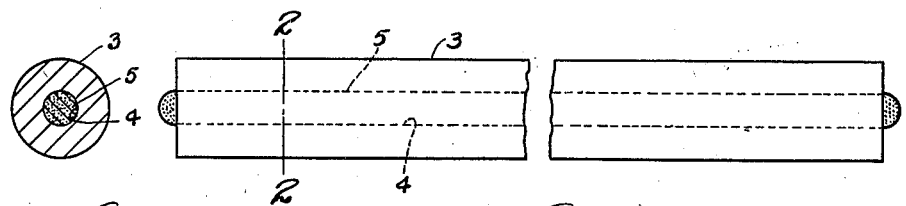
Fig. 1 is an elevational view of an electric arc welding electrode of the invention.
Fig. 2 is a cross-sectional view taken on line 2—2 of Fig. 1.

The electric arc welding of cast iron objects requiring machining subsequent to the welding operation, has heretofore been unsatisfactory due to the extreme hardness of the fusion area of the metal forming the weld. Electrodes constructed of various metals have been produced, with a view to depositing upon or fusing with the cast iron object, an alloy which would readily fuse with cast iron and leave a comparatively soft surface to be machine. Such welds lack the strength of cast iron and ordinarily have a different coefficient of expansion, wherefore weakness in the finished object results. Other electrodes have been produced and constructed to effect a durable steel-like weld, but the hardness of the resultant weld, due to the lack of sufficient and uniform distribution of carbon, rendered machining or working exceedingly difficult. By welding cast iron in the manner and by the means disclosed herein, the metal of the weld is found by test and analysis to be gray cast iron of the same chemical and physical structure, and of substantially the same carbon content, as the metal of the cast iron object being welded. Obviously, then, the metal of the weld may be machined or otherwise worked as if it were an original part of the casting, it being of the same hardness and crystal structure.

The electrode comprises preferably a steel rod or tube 3 of low carbon content and containing approximately 2.5 to 3 percent silicon, the steel tube or rod having an opening or bore 4 containing a core 5 comprising a mixture of pure graphite, preferably in flake form, and an oxide of an alkaline-earth metal, for example, oxide of calcium, sodium, or magnesium, or the bicarbonate of sodium. Calcium oxide is considered preferable because it is comparatively inexpensive and will liberate oxygen readily to carbon during the welding operation. This will be treated in detail later. The carbon or flake graphite and the calcium oxide preferably are mixed with a small amount of tacky or sticky binder substance, such as graphitic glue or pitch, or molasses and the like, after which the resultant slightly dry amorphous mixture is inserted in the bore or longitudinal opening 4 of the electrode body 3. The electrode after filling may, if desired, be baked to dryness in a reducing or neutral atmosphere at a temperature of approximately 800 degrees F., in order to facilitate handling and shipping.

Although the size of the electrode and the density of the core mixture may be proportionately varied to secure the result desired, the proportions of constituents are given below so that the proper proportions for an electrode of any size may be computed. As disclosed herein, the electrode body 3 is of three-fourths inch diameter with a bore of one-fourth inch, the length of the electrode being nine inches. Said electrode contains one ounce of core mixture, and weighs approximately one pound. In cubic measure, the proportion is, approximatey 0.4410 cubic inches core mixture to 3.5343 cubic inches of steel, making a total of 3.9753 cubic inches. By using the above proportions of core mixture and steel, and a source of electricity of 125 to 150 amperes current, the melting rate of the steel and the absorption rate of the core, will be found substantially equal. By "core mixture" is meant a mixture of the proportions 5.25 pounds of pure flake graphite to one (1) pound of calcium oxide, mixed with a binder, this proportion being such that the amount of carbon or graphite, added to the percentage of carbon in the steel or ferrous metal, will total more than 2 percent and less than 10 percent of the weight of the steel or ferrous metal; and the amount of calcium oxide will approximate 20 percent of the combined amount of carbon in the steel and in the core mixture.

By skillful handling, electrode tubes of various grades of steel may be used successfully, but for practical use, steel of the following approximate analysis is preferred: carbon 0.05 percent; manganese 0.12 percent; sulphur and phosphorus under 0.030 percent; silicon 2.50 percent. By utilizing a steel electrode tube of low carbon content, a slower cooling weld, resulting in a better grade of cast iron, is obtained for the reason that the absorption of silicon and carbon in a ferrous solution is an exothermic reaction and consequently it retards cooling of the weld in air.

The presence of silicon in the electrode, (2.5 to 3 percent), serves to bring about a maximum amount of graphite precipitation in the solid solution. As graphite expands upon cooling from the temperature of the electric arc, its presence in and about the weld serves to counteract general shrinkage of the casting and the metal of the weld. Carbon in excess of what the metal can absorb blows off as a kish during the welding operation. The calcium oxide in the core of the electrode acts upon the sulphur and phosphorus of the metal to form a slag and a gas, thereby eliminating the sulphur, which would otherwise counter-act the function of the silicon to precipitate graphite, and also the phosphorus which would impart undesirable brittleness to the weld and casting.

From the foregoing it should be apparent that the method of producing the cast iron weld on an electrically charged cast iron object comprises applying simultaneously to the part to be welded an electrically charged electrode of steel, preferably of low carbon content, and a mixture of pure flake graphite and an oxide of an alkaline-earth metal, such as calcium oxide. Instead of the above mixture, pure flake graphite alone may be used with more or less satisfactory results. The proportion of constituents is of importance in order to insure a good machinable cast iron weld, and for best results, the kinds of materials specified should be employed.

Figure 3:
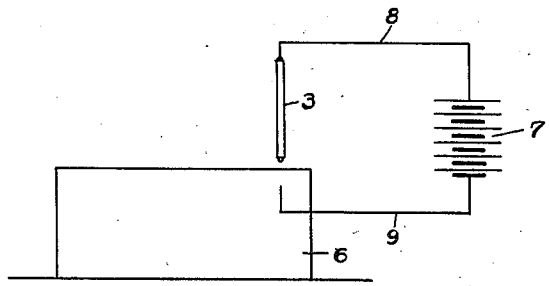
Fig. 3 is a diagrammatical view showing a casting and an electrode electrically connected to a source of electricity.

In Fig. 3 of the drawing, 6 represents a casting to be welded and 3 represents the electrode which is electrically connected to the source of electricity 7 by means of the conductors 8 and 9. The positive pole of the electrical source 7 is shown connected to the casting 6 while the negative pole is connected to the electrode.

It is to be understood that the amount of carbon or graphite in the electrode or welding rod may be reduced by approximately one-half, for the proportions above given provide for a fifty percent (50%) loss or excess of carbon. In the event that the amount of carbon is reduced, the alkaline-earth metal or calcium oxide may be reduced proportionately. Such construction, however, would result in the formation of a comparatively hard cast iron weld.

What is claimed is:

1. A welding rod having in combination a steel body and a mixture of carbon and calcium oxide in approximately the proportions 5.25 pounds carbon, one pound calcium oxide, and 100 pounds steel.

2. A welding rod having in combination a steel body and a mixture of carbon and calcium oxide in approximately the proportiions 5.25 pounds carbon, one pound calcium oxide, and 100 pounds low carbon steel.

3. A welding rod having in combination a steel body and a mixture of carbon and calcium oxide in approximately the proportions 5.25 pounds carbon, one pound calcium oxide, and 100 pounds low carbon steel containing approximately 2.50 percent silicon.

4. A welding rod having in combination a ferrous metal body and a mixture of carbon and calcium oxide in approximately the proportion 100 pounds ferrous metal, 8.5 ounces calcium oxide and from 2 to 10 pounds of carbon.

5. A welding rod having in combination a steel body and a mixture of carbon and an oxidizing compound of an active alkaline earth metal such as calcium, sodium, or magnesium, in approximately the proportions 2.25 pounds carbon, one pound of the oxidizing compounds, and 100 pounds of steel.

6. A welding rod having in combination a steel body and a mixture of carbon and an oxidizing compound of an active alkaline earth metal such as calcium, sodium, or magnesium, in approximately the proportions 5.25 pounds carbon, one pound of the oxidizing compound, and 100 pounds of low carbon steel.

7. A welding rod having in combination a steel body and a mixture of carbon and an oxidizing compound of an active alkaline earth metal such as calcium, sodium, or magnesium, in approximately the proportions 5.25 pounds carbon, one pound of the oxidizing compounds, and 100 pounds of low carbon steel containing approximately 2.50 percent silicon.

8. The method of applying to an object a weld having the characteristics of cast iron, comprising applying heat to the object and to a welding rod comprising steel and carbon, the amount of carbon being not less than 2 percent nor more than 10 percent, by weight, of the weight of the steel, until fusion between the rod and object occurs.

9. The method of applying to an object a weld having the characteristics of cast iron, comprising applying heat to the object and to a welding rod comprising steel, carbon, and an oxidizing compound of an active alkaline earth metal such as calcium, sodium, or magnesium, the amount of carbon being not less than 2 percent nor more than 10 percent, by weight, of the weight of the steel, and the oxidizing compound being equal, in weight, to approximately 20 percent of the amount of carbon.

10. The method of producing a cast iron weld upon a cast iron object, said method consisting of applying heat to the object and to a welding rod comprising steel of low carbon content, graphite, and an oxidizing compound of an active alkaline earth metal such as calcium, sodium, or magnesium, the amount of carbon being not less than 2 percent nor more than 10 percent, by weight, of the weight of the steel, and the oxidizing compound being equal, in weight, to approximately 20 percent of the amount of carbon.

11. A welding rod having in combination a ferrous metal body and a mixture of carbon and oxide of sodium in approximately the proportion 100 pounds ferrous metal, 8.5 ounces oxide of sodium, and from 2 to 10 pounds of carbon.

12. An electrode comprising an iron body containing from 1 to 3 percent silicon and a quantity of carbon which when added to that contained in the body will approximate more than 2 percent and less than 10 percent, by weight, of the weight of the iron.

13. An electrode comprising a steel body and particles of ferrous metal containing from 1 to 3 percent silicon, and a quantity of carbon which when added to that contained in the body and particles will approximate more than 2 percent and less than 10 percent, by weight, of the weight of the body and particles.

14. An electrode comprising a steel body containing from 1 to 3 percent silicon and a quantity of carbon which when added to that contained in the body will approximate more than 2 percent and less than 10 percent, by weight, of the weight of the body, and a quantity of an oxidizing compound of alkaline earth metal such as sodium, calcium or magnesium, approximating 20 percent of the weight of the carbon used in the electrode.

In testimony whereof, I have hereunto subscribed my name this 30th day of August, 1930.

ERWIN H. WALDMAN.

CERTIFICATE OF CORRECTION.

Patent No. 1,880,545.    October 4, 1932.

ERWIN H. WALDMAN.

It is hereby certified that error appears in the printed specification of the above numbered patent requiring correction as follows: Page 3, line 8, claim 5, for "2.25" read "5.25"; lines 22 and 23, claim 7, for "compounds" read "compound"; and that the said Letters Patent should be read with these corrections therein that the same may conform to the record of the case in the Patent Office.

Signed and sealed this 29th day of November, A. D. 1932.

(Seal)

M. J. Moore,
Acting Commissioner of Patents.